(12) United States Patent
Li et al.

(10) Patent No.: US 12,114,303 B2
(45) Date of Patent: Oct. 8, 2024

(54) METHOD FOR AGGREGATION TRANSMISSION OF MULTI-USER DOWNLINK DATA AND APPARATUS

(71) Applicant: HUAWEI TECHNOLOGIES CO., LTD., Shenzhen (CN)

(72) Inventors: Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 17/704,562

(22) Filed: Mar. 25, 2022

(65) Prior Publication Data

US 2022/0217732 A1 Jul. 7, 2022

Related U.S. Application Data

(63) Continuation of application No. PCT/CN2019/108633, filed on Sep. 27, 2019.

(51) Int. Cl.
| | |
|---|---|
| *H04W 72/121* | (2023.01) |
| *H04L 1/00* | (2006.01) |
| *H04L 1/1607* | (2023.01) |
| *H04L 5/00* | (2006.01) |
| *H04W 72/1273* | (2023.01) |

(52) U.S. Cl.
CPC ......... *H04W 72/121* (2013.01); *H04L 1/0009* (2013.01); *H04L 1/1621* (2013.01); *H04L 5/0053* (2013.01); *H04W 72/1273* (2013.01)

(58) Field of Classification Search
USPC ............................ 455/450–455; 370/322–325
See application file for complete search history.

(56) References Cited

U.S. PATENT DOCUMENTS

2018/0324764 A1* 11/2018 Bendlin ............... H04W 72/23

FOREIGN PATENT DOCUMENTS

| CN | 104852777 A | 8/2015 |
|---|---|---|
| CN | 105391534 A | 3/2016 |
| CN | 106341847 A | 1/2017 |
| CN | 107889268 A | 4/2018 |

(Continued)

OTHER PUBLICATIONS

India Examination Report issued in corresponding India Application No. 202247012443, dated Aug. 4, 2022, pp. 1-6.

(Continued)

*Primary Examiner* — Suhail Khan
(74) *Attorney, Agent, or Firm* — Hauptman Ham, LLP

(57) ABSTRACT

A method for aggregation transmission of multi-user downlink data and an apparatus. A network device performs, based on a specific aggregation rule, bit aggregation on downlink data of a terminal device in a terminal device group, performs channel encoding and modulation on data obtained through the bit aggregation, and sends the data to a plurality of terminal devices participating in aggregation transmission. Each terminal device that receives the downlink data obtains, based on the aggregation rule, respective downlink data from the received data obtained through the bit aggregation. According to this method, the network device performs channel encoding on an aggregated bit sequence, thereby increasing a sequence length before encoding, and improving a coding gain.

16 Claims, 5 Drawing Sheets

(56) References Cited

FOREIGN PATENT DOCUMENTS

| EP | 3065307 A1 | 9/2016 |
|---|---|---|
| WO | 2008024631 A2 | 2/2008 |
| WO | 2019157914 A1 | 8/2019 |

OTHER PUBLICATIONS

Deawon Lee et al: "STA MU-MIMO Group Management Signaling Design IEEE 802.11-10/0782r0", Jul. 13, 2010, total 18 pages.
International Search Report issued in corresponding International Application No. PCT/CN2019/108633, dated Jun. 23, 2020, pp. 1-9.
Huawei et al: "Channel coding for URLLC", 3GPP Draft; R1-1801467, Feb. 17, 2018, XP051397566, total 10 pages.
Extended European Search Report issued in corresponding European Application No. 19947396.8, dated Jul. 15, 2022, pp. 1-8.

\* cited by examiner

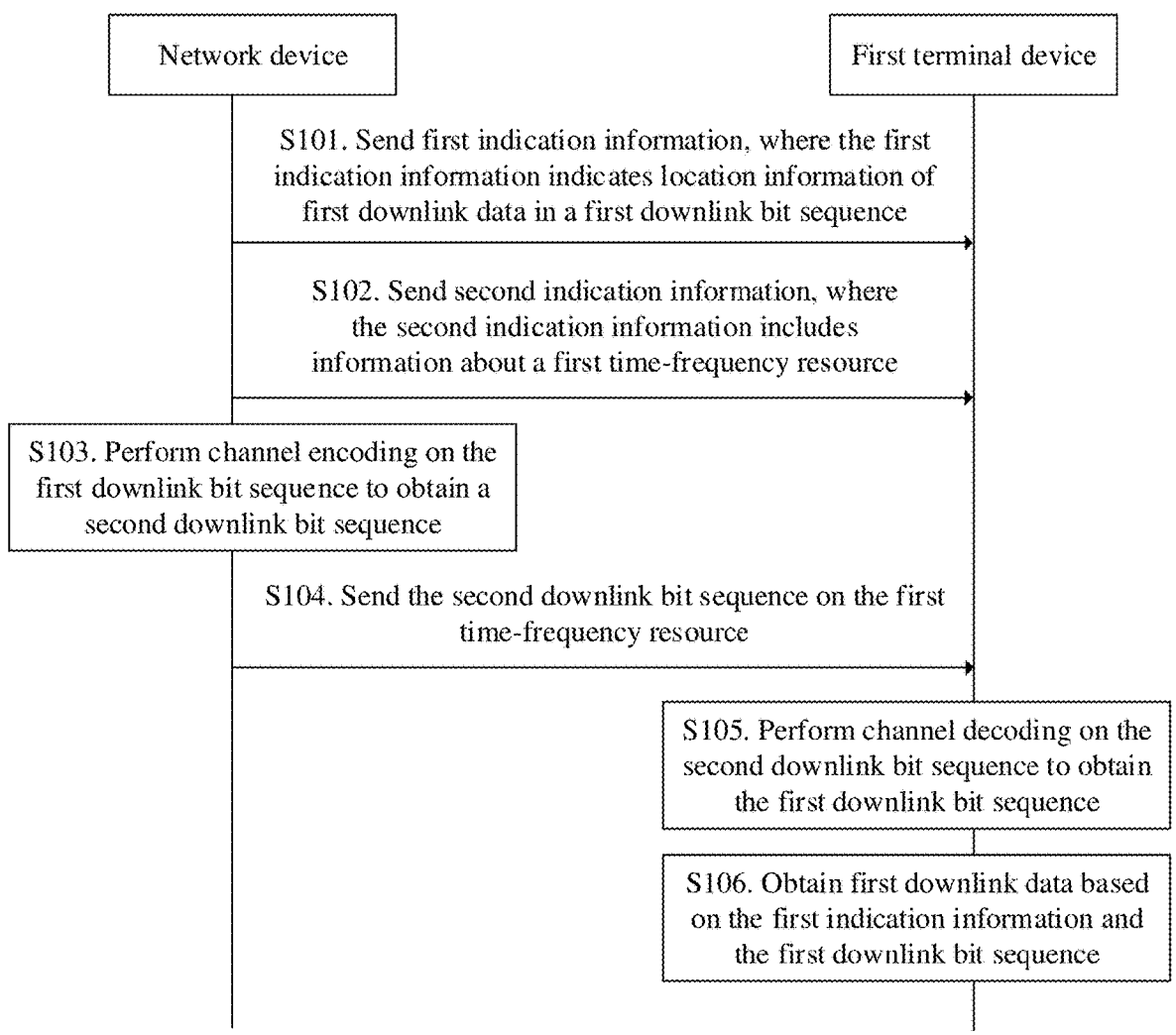

METHOD FOR AGGREGATION TRANSMISSION OF MULTI-USER DOWNLINK DATA AND APPARATUS

CROSS-REFERENCE TO RELATED APPLICATION

This application is a continuation of International Application No. PCT/CN2019/108633, filed on Sep. 27, 2019, the disclosure of which is hereby incorporated by reference in its entirety.

BACKGROUND

Compared with a fourth generation (4G) mobile communications system, a significant feature of a fifth generation (5G) mobile communications system is that an ultra-reliable and low-latency communication (URLLC) service is additionally supported. There are a plurality of types of URLLC services. Typical examples include industrial control, self-driving, remote surgery, a smart grid, and the like. For the URLLC service, a typical prerequisite is that reliability of sending 32-byte data within 1 millisecond (ms) reaches 99.999%. The foregoing performance indicator is merely an example, and different URLLC services are configured to have different prerequisites on reliability. For example, in some extremely demanding industrial control application scenarios, a transmission success probability of URLLC service data needs to reach 99.9999999% within 0.25 ms.

In many URLLC application scenarios, data packets tend to be small. For example, for many typical applications in a smart factory, downlink data packets are mostly control commands or management signaling, and uplink data packets are feedback information after some actions are executed, simple location update, or information collected from the outside, and has a few bytes to dozens of bytes. Because transmission of URLLC service data requires very high reliability, more resources often need to be used for these data packets for data transmission, thereby ensuring reliability of data packet transmission. In a URLLC application scenario with massive connections for transmission of a small data packet, spectrum resources are greatly consumed in an existing transmission manner, and a very large bandwidth is required to ensure normal data transmission.

SUMMARY

This application provides a method for aggregation transmission of multi-user downlink data and an apparatus. A network device performs bit aggregation on data to be sent to a plurality of terminal devices in a terminal device group, and then sends the data to each terminal device in the terminal device group after channel encoding, thereby improving a coding gain and transmission efficiency on an air interface.

According to a first aspect, this application provides a method for aggregation transmission of multi-user downlink data. The method is performed by a first communications apparatus, and the first communications apparatus is a first terminal device or a module of the first terminal device. An example in which the terminal device is an execution body is used herein for description. The first terminal device receives first indication information from a network device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The first terminal device receives second indication information from the network device. The second indication information includes information about a first time-frequency resource. The first terminal device receives a second downlink bit sequence from the network device on the first time-frequency resource. The first terminal device performs channel decoding on the second downlink bit sequence to obtain the first downlink bit sequence. The first terminal device obtains the first downlink data based on the first indication information and the first downlink bit sequence.

According to the method described in the first aspect, the network device performs, based on a specific rule, bit aggregation on the downlink data of the N terminal devices, and performs channel encoding on an aggregated bit sequence, thereby increasing a sequence length before encoding, and improving a coding gain.

In a possible implementation of the first aspect, the first terminal device receives a first index from the network device, where the first index is an index of the first terminal device in the terminal device group.

In a possible implementation of the first aspect, the first terminal device determines a second time-frequency resource based on the first index and a reference time-frequency resource, where the second time-frequency resource is used to send first feedback information, and the first feedback information is acknowledgement information of the first downlink data.

In a possible implementation of the first aspect, the first terminal device sends the first feedback information to the network device on the second time-frequency resource.

In a possible implementation of the first aspect, the first terminal device obtains first location information. The first location information is location information of first check information in the first downlink bit sequence, the first location information is different from second location information, the second location information is location information of second check information in the first downlink bit sequence, the first check information is a parity bit of the first downlink data, the second check information is a parity bit of second downlink data, the second downlink data is downlink data of a second terminal device, and the second terminal device is a terminal device other than the first terminal device in the N terminal devices. The first terminal device determines the first check information based on the first location information and the first downlink bit sequence. In this implementation, the first terminal device determines, by using a CRC parity bit corresponding to the first downlink data, whether the first downlink data is correctly received, without being affected by whether downlink data of another terminal device is correctly received.

In a possible implementation of the first aspect, the first terminal device determines the first feedback information based on the first check information.

In a possible implementation of the first aspect, the first location information includes a start location, an end location, or a bit length of the first check information in the first downlink bit sequence; and the second location information includes a start location, an end location, or a bit length of the second check information in the first downlink bit sequence.

According to a second aspect, this application provides a method for aggregation transmission of multi-user downlink data. The method is performed by a second communications apparatus, and the second communications apparatus is a network device or a module of the network device. An example in which the network device is an execution body is used herein for description. The network device sends first indication information to a first terminal device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The network device sends second indication information to the first terminal device. The second indication information includes information about a first time-frequency resource. The network device performs channel encoding on the first downlink bit sequence to obtain a second downlink bit sequence. The network device sends the second downlink bit sequence to the first terminal device on the first time-frequency resource.

The method described in the second aspect is a network-side method corresponding to the method described in the first aspect. Therefore, beneficial effects that is configured to be achieved in the first aspect is configured to further be achieved.

In a possible implementation of the second aspect, the network device sequentially concatenates the first downlink data, first check information, second downlink data, and second check information to obtain the first downlink bit sequence, where the first check information is a parity bit of the first downlink data, the second downlink data is downlink data of a second terminal device, the second check information is a parity bit of the second downlink data, and the second terminal device is a terminal device other than the first terminal device in the N terminal devices.

In a possible implementation of the second aspect, a first index is sent to the first terminal device, where the first index is an index of the first terminal device in the terminal device group, and the terminal device group includes the N terminal devices.

In a possible implementation of the second aspect, a second time-frequency resource is determined based on the first index and a reference time-frequency resource, where the second time-frequency resource is used to receive first feedback information, and the first feedback information is acknowledgement information of the first downlink data.

In a possible implementation of the second aspect, the network device receives the first feedback information from the first terminal device on the second time-frequency resource.

In a possible implementation of the first aspect or the second aspect, the first indication information indicates a start location or an end location of the first downlink data in the first downlink bit sequence; or the first indication information indicates a sequence number of the first downlink data in the first downlink bit sequence and a bit length of the downlink data of each of the N terminal devices.

According to a third aspect, a communications apparatus is provided. The communications apparatus includes a functional module configured to implement the method according to any one of the first aspect or the possible implementations of the first aspect.

According to a fourth aspect, a communications apparatus is provided. The communications apparatus includes a functional module configured to implement the method according to any one of the second aspect or the possible implementations of the second aspect.

According to a fifth aspect, a communications apparatus is provided. The communications apparatus includes a processor and an interface circuit. The interface circuit is configured to: receive a signal from a communications apparatus other than the communications apparatus and transmit the signal to the processor, or send a signal from the processor to a communications apparatus other than the communications apparatus. The processor is configured to implement the method according to any one of the first aspect or the possible implementations of the first aspect by using a logic circuit or by executing code instructions.

According to a sixth aspect, a communications apparatus is provided. The communications apparatus includes a processor and an interface circuit. The interface circuit is configured to: receive a signal from a communications apparatus other than the communications apparatus and transmit the signal to the processor, or send a signal from the processor to a communications apparatus other than the communications apparatus. The processor is configured to implement the method according to any one of the second aspect or the possible implementations of the second aspect by using a logic circuit or by executing code instructions.

According to a seventh aspect, a computer-readable storage medium is provided. The computer-readable storage medium stores a computer program or instructions. When the computer program or the instructions are executed, the method according to any one of the first aspect or the possible implementations of the first aspect is implemented.

According to an eighth aspect, a computer-readable storage medium is provided. The computer-readable storage medium stores a computer program or instructions. When the computer program or the instructions are executed, the method according to any one of the second aspect or the possible implementations of the second aspect is implemented.

According to a ninth aspect, a computer program product including instructions is provided. When the instructions are run, the method according to any one of the first aspect or the possible implementations of the first aspect is implemented.

According to a tenth aspect, a computer program product including instructions is provided. When the instructions are run, the method according to any one of the second aspect or the possible implementations of the second aspect is implemented.

According to an eleventh aspect, a computer program is provided. The computer program includes code or instructions. When the code or the instructions are run, the method according to any one of the first aspect or the possible implementations of the first aspect is implemented.

According to a twelfth aspect, a computer program is provided. The computer program includes code or instructions. When the code or the instructions are run, the method according to any one of the second aspect or the possible implementations of the second aspect is implemented.

BRIEF DESCRIPTION OF DRAWINGS

FIG. 2 is a schematic diagram of a first downlink bit sequence according to an embodiment of this application;

FIG. 3 is a schematic diagram of a first downlink bit sequence according to an embodiment of this application;

FIG. 4 is a schematic flowchart of a method for aggregation transmission of multi-user downlink data according to an embodiment of this application;

DESCRIPTION OF EMBODIMENTS

Figure 1:
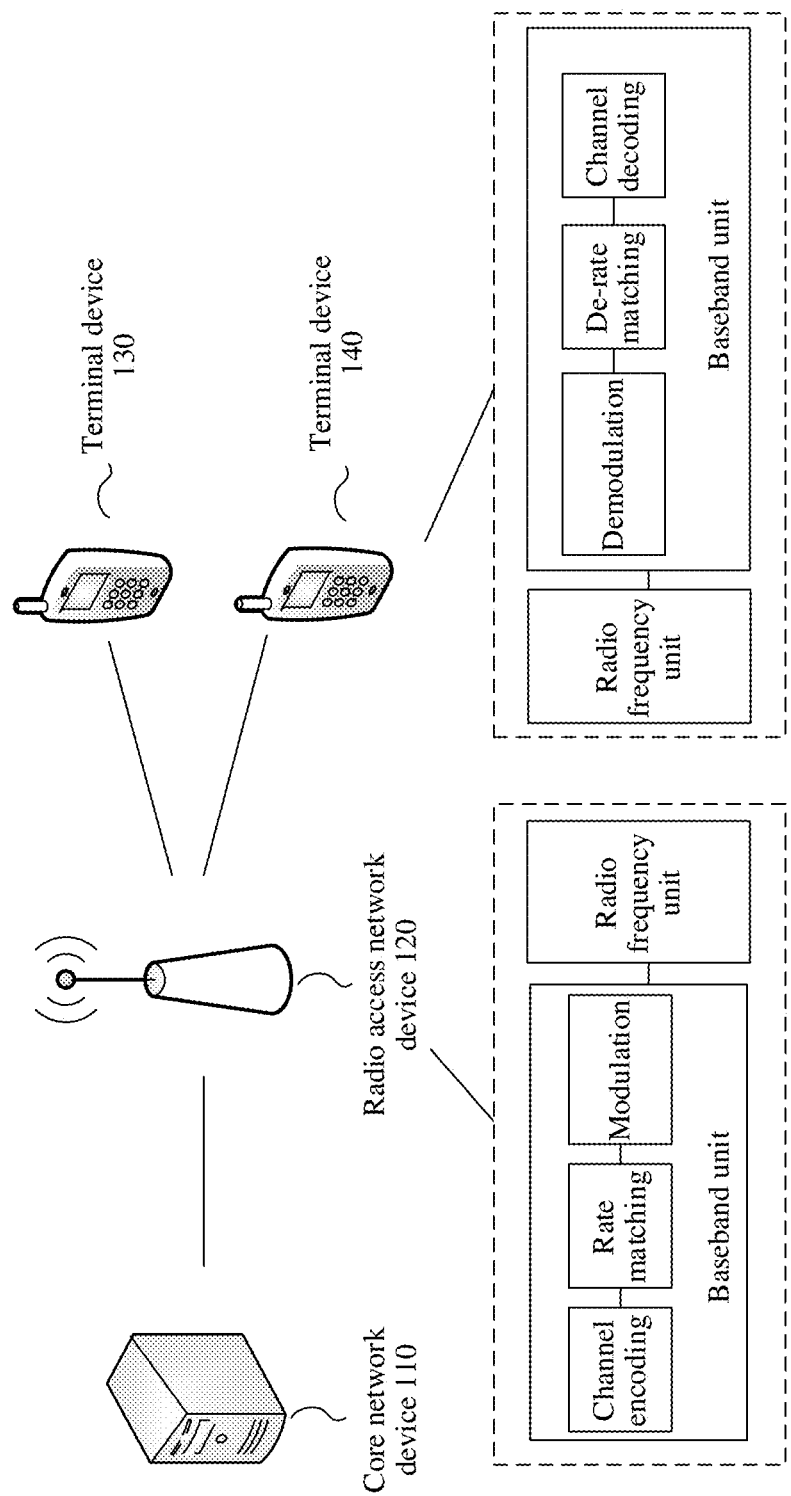
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The radio access network device 120 includes a baseband unit and a radio frequency unit. For downlink data transmission, the baseband unit includes a channel encoding module, a rate matching module, and a modulation module. The terminal device (the terminal device 130 and the terminal device 140 in FIG. 1) includes a radio frequency unit and a baseband unit. For downlink data transmission, the baseband unit includes a demodulation module, a de-rate matching module, and a channel decoding module. The terminal device is connected to the radio access network device in a wireless manner, and the radio access network device is connected to the core network device in a wireless or wired manner. The core network device and the radio access network device is independent and different physical devices, or a function of the core network device and a logical function of the radio access network device is integrated into a same physical device, or some functions of the core network device and some functions of the radio access network device is integrated into one physical device. The terminal device is at a fixed location or is movable. FIG. 1 is a schematic diagram. The communications system further includes another network device, for example, further includes a wireless relay device and a wireless backhaul device, which are not shown in FIG. 1. A quantity of core network devices, a quantity of radio access network devices, and a quantity of terminal devices included in the mobile communications system are not limited in this embodiment of this application.

The radio access network device is an access device that is accessed by the terminal device in a wireless manner and that is in the mobile communications system. The radio access network device is a base station, an evolved NodeB (eNodeB), a transmission reception point (TRP), a next generation NodeB (gNB) in a 5G mobile communications system, a base station in a future mobile communications system, an access node in a Wi-Fi system, and the like, or is a module or a unit that performs some functions of a base station, for example, is a central unit (CU) or a distributed unit (DU). A specific technology and a specific device form used by the radio access network device are not limited in the embodiments of this application. In this application, the radio access network device is referred to as a network device for short. Unless otherwise specified, network devices are radio access network devices.

The terminal device is configured to further be referred to as a terminal, user equipment (UE), a mobile station, a mobile terminal, or the like. The terminal device is a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

The network device and the terminal device is deployed on the land, including an indoor device, an outdoor device, a handheld device, or a vehicle-mounted device; is deployed on the water; or is deployed on an airplane, a balloon, and a satellite in the air. Application scenarios of the network device and the terminal device are not limited in the embodiments of this application.

Communication between the network device and the terminal device is performed by using a licensed spectrum, or is performed by using an unlicensed spectrum, or is performed by using both a licensed spectrum and an unlicensed spectrum. Communication between the network device and the terminal device is performed by using a spectrum below 6 gigahertz (GHz), or is performed by using a spectrum above 6 GHz, or is performed by using both a spectrum below 6 GHz and a spectrum above 6 GHz. A spectrum resource used between the network device and the terminal device is not limited in the embodiments of this application.

In a 5G new radio (NR) system, downlink data is carried on a physical uplink shared channel (PUSCH), and a low-density parity check (LDPC) code is used for channel encoding. One of the characteristics of the LDPC code is that a performance advantage is configured to be fully reflected when a code length is relatively long. In many URLLC services, a data packet is usually relatively small. Compared with a large data packet, coding efficiency of a small data packet is relatively low. As a result, spectrum resources are greatly consumed in a URLLC application scenario with massive connections for transmission of a small data packet.

An embodiment of this application provides a method for aggregation transmission of multi-user downlink data. A network device performs bit aggregation on data to be sent to a plurality of terminal devices in a terminal device group, and then sends the data to each terminal device in the terminal device group after channel encoding, thereby improving a coding gain and transmission efficiency on an air interface.

The following describes the technical solutions in this application in detail by using some embodiments. FIG. 4 is a schematic flowchart of a method for aggregation transmission of multi-user downlink data according to an embodiment of this application. This embodiment relates to a specific process of performing downlink data transmission between a network device and a terminal device. A core idea of this embodiment is that the network device performs, based on a specific aggregation rule, bit aggregation on downlink data of the terminal device in a terminal device group, performs channel encoding and modulation on data obtained through the bit aggregation, and sends the data to a plurality of terminal devices participating in aggregation transmission. Each terminal device that receives the downlink data obtains, based on the aggregation rule, respective downlink data from the received data obtained through the bit aggregation. The following uses an example in which the network device and a first terminal device perform the method for description. The first terminal device is one terminal device in the terminal device group. The method is further performed by a module of the network device and a module of the first terminal device, for example, a chip. As shown in FIG. 4, the method includes the following steps.

S101. The network device sends first indication information to the first terminal device. Correspondingly, the first terminal device receives the first indication information from the network device.

The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in the terminal device group.

There is different implementations for the first indication information herein. For example, the first indication information indicates a start location or an end location of the first downlink data in the first downlink bit sequence. The first indication information indicates a start location or an end location of the downlink data of each of the N terminal devices in the first downlink bit sequence. Alternatively, the first indication information indicates a sequence number of the first downlink data in the first downlink bit sequence and a bit length of the downlink data of each of the N terminal devices. During specific implementation, the bit length of the downlink data of each of the N terminal devices are sequentially allocated based on a ranking of the downlink data in the first downlink bit sequence. Alternatively, the first indication information indicates a sequence number of the first downlink data in the first downlink bit sequence. Optionally, the bit length of the downlink data of each of the N terminal devices is the same. During specific implementation, the first terminal device determines the bit length of the downlink data of each terminal device based on a length of the first downlink bit sequence and a quantity N of terminal devices participating in aggregation.

The first indication information is carried on signaling. In this application, the signaling is radio resource control (RRC) signaling, or is downlink control information (DCI). The network device is configured to separately send DCI to the N terminal devices, the network device is configured to send one piece of common DCI, where the common DCI is sent to terminal devices in a cell, or the network device is configured to send one piece of group common DCI, where the group common DCI is sent to the N terminal devices or sent to the terminal device group.

S102. The network device sends second indication information to the first terminal device. The second indication information includes information about a first time-frequency resource.

Correspondingly, the first terminal device receives the second indication information from the network device. Optionally, the first terminal device receives the second indication information based on third indication information. The third indication information is sent by the network device to the first terminal device by using signaling, and the third indication information includes an identifier of the terminal device group to which the first terminal device belongs. In this application, the terminal device group has M terminal devices in total, and M is an integer greater than or equal to N. Optionally, the third indication information further includes identifiers of the M terminal devices. The second indication information is carried on the DCI, and the first terminal device determines, based on the identifier of the terminal device group in the third indication information, a radio network temporary identifier (RNTI) used by the network device to scramble a cyclic redundancy check (CRC) parity bit of the DCI, and descrambles the CRC parity bit by using the RNTI, to determine the information about the first time-frequency resource.

S103. The network device performs channel encoding on the first downlink bit sequence to obtain a second downlink bit sequence.

The network device determines the first downlink bit sequence based on the first downlink data and second downlink data, where the second downlink data is downlink data of a second terminal device, and the second terminal device is a terminal device other than the first terminal device in the N terminal devices. The network device determines the first downlink bit sequence in the following two optional manners. However, this is not limited in this application. The network device is configured to use signaling to notify the first terminal device of a manner used to determine the first downlink bit sequence.

In the first optional manner, the network device calculates a parity bit corresponding to the downlink data of each of the N terminal devices, and performs, based on a specific aggregation sequence, bit aggregation on the downlink data of each of the N terminal devices and the parity bit corresponding to the downlink data of each of the N terminal devices, to obtain the first downlink bit sequence. The network device sequentially concatenates the first downlink data, first check information, the second downlink data, and second check information to obtain the first downlink bit sequence, where the first check information is a parity bit of the first downlink data, and the second check information is a parity bit of the second downlink data. In this application, check information is described by using the CRC parity bit as an example. However, this is not limited in this application, and another type of parity bit is used.

For example, N is equal to 4. Terminal devices participating in aggregation are respectively a terminal device 1, a terminal device 2, a terminal device 3, and a terminal device 4. Downlink data corresponding to the terminal device 1 is downlink data 1, downlink data corresponding to the terminal device 2 is downlink data 2, downlink data corresponding to the terminal device 3 is downlink data 3, and downlink data corresponding to the terminal device 4 is downlink data 4. A CRC parity bit corresponding to the downlink data 1 is CRC1, a CRC parity bit corresponding to the downlink data 2 is CRC2, a CRC parity bit corresponding to the downlink data 3 is CRC3, and a CRC parity bit corresponding to the downlink data 4 is CRC4. Assuming that an aggregation sequence of the four terminal devices is: the terminal device 1, the terminal device 2, the terminal device 3, and the terminal device 4, the first downlink bit sequence obtained through the bit aggregation is shown in FIG. 2.

In the second optional manner, the network device performs bit aggregation on the downlink data of each of the N terminal devices based on a specific aggregation sequence, and then calculates third check information for the data obtained through the bit aggregation, to obtain the first downlink bit sequence. The four terminal devices are used as an example. An aggregation sequence of the four terminal devices is: the terminal device 1, the terminal device 2, the terminal device 3, and the terminal device 4, the third check information calculated by the network device is CRC5, and the first downlink bit sequence is shown in FIG. 3.

After the network device determines the first downlink bit sequence, the network device performs channel encoding on the first downlink bit sequence to obtain the second downlink bit sequence.

S104. The network device sends the second downlink bit sequence to the first terminal device on the first time-frequency resource.

Correspondingly, the first terminal device receives the second downlink bit sequence from the network device on the first time-frequency resource.

S105. The first terminal device performs channel decoding on the second downlink bit sequence to obtain the first downlink bit sequence.

S106. The first terminal device obtains the first downlink data based on the first indication information and the first downlink bit sequence. The following provides descriptions in two cases.

Case 1: The network device determines the first downlink bit sequence based on the first manner in step S103, that is, the network device calculates the CRC parity bit for the downlink data of each of the N terminal devices participating in aggregation, and then performs the bit aggregation, to obtain the first downlink bit sequence.

S106a. The first terminal device obtains first location information, and the first terminal device determines the first check information based on the first location information and the first downlink bit sequence. The first location information includes at least one of a start location, an end location, and a bit length of the first check information in the first downlink bit sequence, and the first check information is a CRC parity bit of the first downlink data. In this application, the second terminal device is a terminal device other than the first terminal device in the N terminal devices. The downlink data of the second terminal device is the second downlink data, a CRC parity bit of the second downlink data is the second check information, location information of the second check information in the first downlink bit sequence is second location information, and the second location information is different from the first location information.

The first location information is preset. For example, the first location information includes the bit length of the first check information, and the bit length is preset. The first location information includes the start location of the first check information in the first downlink bit sequence, and the start location is preset. For example, the start location of the first check information is a bit next to the last bit of the first downlink data. Alternatively, the first location information includes the start location of the first check information in the first downlink bit sequence, and the first terminal device obtains the first check information based on the start location, where the bit length of the first check information is preset. Alternatively, the first location information includes the end location of the first check information in the first downlink bit sequence, and the first terminal device obtains the first check information based on the end location, where the bit length of the first check information is preset. Alternatively, the first location information includes the bit length of the first check information, the start location of the first check information is preset, for example, the start location is a bit next to the last bit of the first downlink data, and the first terminal device obtains the first check information based on the bit length and the start location. Alternatively, the first location information includes any two of the start location, the end location, and the bit length of the first check information in the first downlink bit sequence, and the first terminal device obtains the first check information based on the first location information.

S106b. The first terminal device obtains the first downlink data based on the first indication information and the first downlink bit sequence. The first indication information indicates a start location of the first downlink data in the first downlink bit sequence, and the first terminal device obtains the first downlink data based on the start location and a bit length of the first downlink data, where the bit length of the first downlink data is preset. Alternatively, the first indication information indicates an end location of the first downlink data in the first downlink bit sequence, and the first terminal device obtains the first downlink data based on the end location and a bit length of the first downlink data, where the bit length of the first downlink data is preset. Alternatively, the first indication information indicates an aggregation sequence number of the first downlink data in the first downlink bit sequence and a bit length of the downlink data of each of the N terminal devices, and the first terminal device obtains the first downlink data based on the aggregation sequence number and the bit length of the downlink data of each of the N terminal devices. For example, if the aggregation sequence number of the first downlink data is 1, and the bit length of the downlink data of each terminal device is 20 bytes, the first downlink data is the first byte to the $20^{th}$ byte in the first downlink bit sequence.

S106c. The first terminal device determines, based on the first check information, whether the first downlink data is successfully decoded.

Case 2: The network device determines the first downlink bit sequence based on the second manner in step S103, that is, the network device performs the bit aggregation on the downlink data of each of the N terminal devices participating in aggregation, and then calculates the CRC parity bit, to obtain the first downlink bit sequence.

For a specific process in which the first terminal device obtains the first downlink data based on the first indication information and the first downlink bit sequence, refer to related descriptions in S106b.

The first terminal device obtains the third check information from the first downlink bit sequence based on a bit length of the third check information, and further determine, based on the third check information, whether the first downlink bit sequence is successfully decoded, to determine whether the first downlink data is correctly received.

In this embodiment, the network device performs, based on a specific rule, bit aggregation on the downlink data of the N terminal devices, and performs channel encoding on an aggregated bit sequence, thereby increasing a sequence length before encoding, and improving a coding gain. Then, the network device calculates the CRC parity bit corresponding to the downlink data of each of the N terminal devices, and performs, based on the specific aggregation sequence, the bit aggregation on the downlink data of each of the N terminal devices and the CRC parity bit corresponding to the downlink data of each of the N terminal devices. In this way, the terminal device determines, by using the CRC parity bit of the downlink data of the terminal device, whether the downlink data is correctly received, without being affected by whether downlink data of another terminal device is correctly received.

Figure 5:
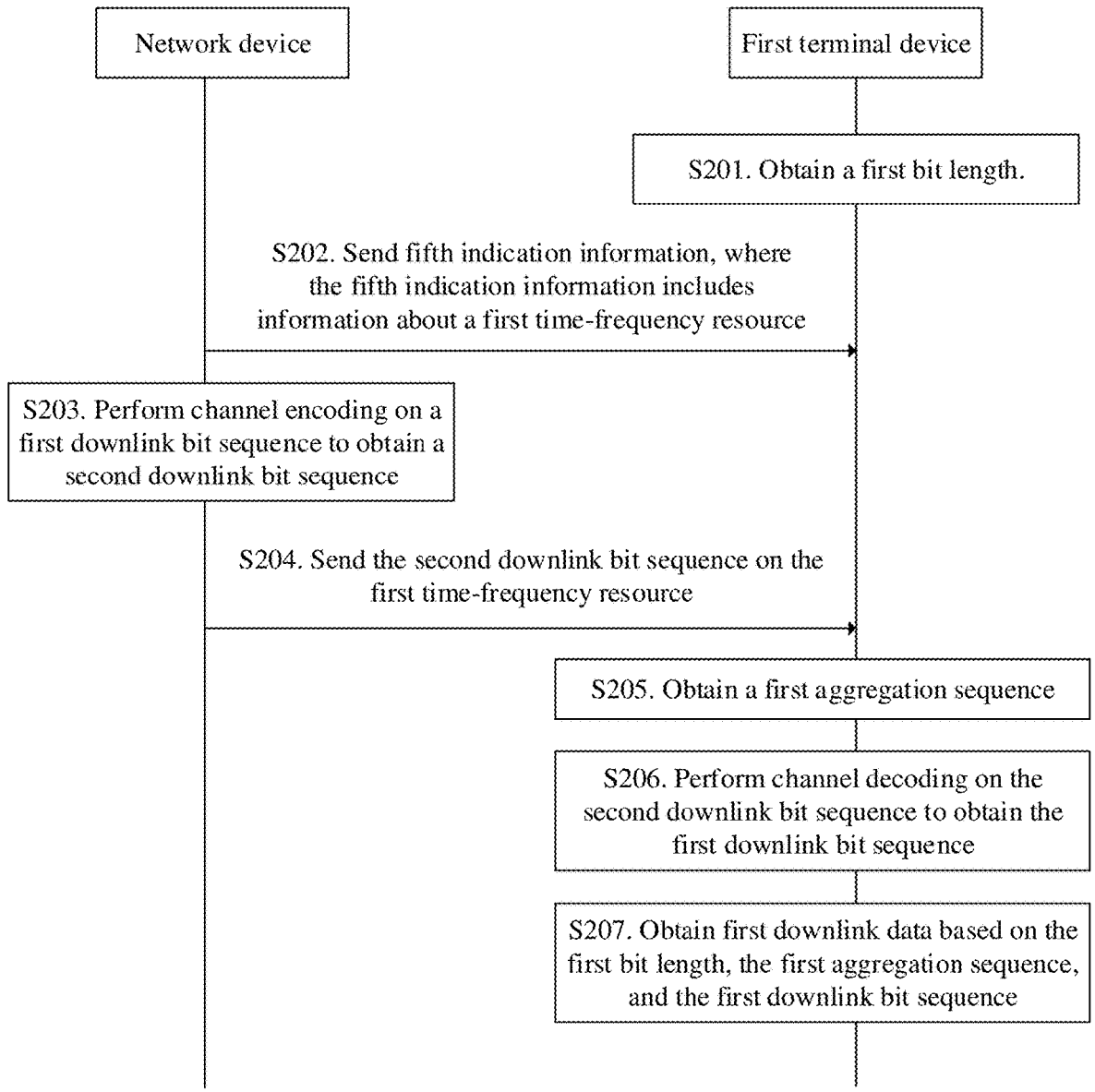
FIG. 5 is a schematic flowchart of a method for aggregation transmission of multi-user downlink data according to an embodiment of this application.

FIG. 5 is a schematic flowchart of a method for aggregation transmission of multi-user downlink data according to an embodiment of this application. This embodiment relates to a specific process of performing downlink data transmission between a network device and a terminal device. A core idea of this embodiment is that the network device performs, based on a specific aggregation sequence, bit aggregation on downlink data of the terminal device in a terminal device group, performs channel encoding and modulation on data obtained through the bit aggregation, and sends the data to a plurality of terminal devices participating in aggregation transmission. A bit length of downlink data of each terminal device participating in aggregation is the same. Each terminal device that receives the downlink data obtains, based on the bit length and the aggregation sequence, respective downlink data from the received data obtained through the bit aggregation. The following uses an example in which the network device and a first terminal device perform the method for description. The first terminal device is one terminal device in the terminal device group. The method is further performed by a module of the network device and a module of the first terminal device, for example, a chip. As shown in FIG. 5, the method includes the following steps.

S201. The first terminal device obtains a first bit length.

The first bit length is a bit length of downlink data of each of N terminal devices in a first downlink bit sequence. The first downlink bit sequence herein includes the downlink data of each of the N terminal devices, and the first downlink bit sequence is a bit sequence on which channel encoding is not performed. The first terminal device is one of the N terminal devices, and N is an integer greater than 1. In an optional manner, the network device sends fourth indication information to the first terminal device by using signaling, to indicate the first bit length.

S202. The network device sends fifth indication information to the first terminal device. The fifth indication information includes information about a first time-frequency resource.

Correspondingly, the first terminal device receives the fifth indication information from the network device. The terminal device group to which the first terminal device belongs includes M terminal devices in total, M is an integer greater than or equal to N, and the N terminal devices are N terminal devices in the terminal device group. The fifth indication information further includes information used to indicate whether the M terminal devices participate in the aggregation transmission. The fifth indication information includes a first bit field, and the first bit field includes M bits that correspond to the M terminal devices, and is used to indicate whether the M terminal devices participate in the aggregation transmission. For example, when a value of an $m^{th}$ bit in the first bit field is 1, the indication is that an $m^{th}$ terminal device in the terminal device group participates in the aggregation transmission. When a value of an $m^{th}$ bit in the first bit field is 0, the indication is that an $m^{th}$ terminal device in the terminal device group does not participate in the aggregation transmission. Alternatively, when a value of an $m^{th}$ bit in the first bit field is 1, the indication is that an $m^{th}$ terminal device in the terminal device group does not participate in the aggregation transmission. When a value of an $m^{th}$ bit in the first bit field is 0, the indication is that an $m^{th}$ terminal device in the terminal device group participates in the aggregation transmission. A correspondence between each of the M bits and the M terminal devices in the terminal device group is preset, and the first terminal device determines, based on a value of a bit corresponding to the first terminal device in the M bits, whether to participate in data aggregation.

Optionally, the first terminal device receives the fifth indication information based on third indication information. The third indication information is sent by the network device to the first terminal device by using signaling, and the third indication information includes an identifier of the terminal device group to which the first terminal device belongs. For specific descriptions of the third indication information, refer to related descriptions in S102.

S203. The network device performs channel encoding on the first downlink bit sequence to obtain a second downlink bit sequence.

For detailed descriptions of the step, refer to S103 in FIG. 4.

S204. The network device sends the second downlink bit sequence to the first terminal device on the first time-frequency resource. Correspondingly, the first terminal device receives the second downlink bit sequence from the network device on the first time-frequency resource.

S205. The first terminal device obtains a first aggregation sequence, where the first aggregation sequence is a sequence in which the downlink data of the N terminal devices is aggregated in the first downlink bit sequence.

In an optional manner, the M bits of the first bit field in the fifth indication information implicitly include the first aggregation sequence, and the first terminal device determines the first aggregation sequence based on the first bit field. For example, both M and N are equal to 4. Aggregation sequence numbers corresponding to the first bit, the second bit, the third bit, and the fourth bit of the first bit field is 0, 1, 2, 3, or is 1, 2, 3, or 4 respectively. For example, M is equal to 4 and N is equal to 2. A value of the first bit field is "0101", that is, values of the first bit and the third bit of the first bit field are 0, and values of the second bit and the fourth bit of the first bit field are 1. The value 1 indicates participating in aggregation transmission. In this case, the first terminal device determines, based on the value of the first bit field, that a terminal device 2 and a terminal device 4 participate in aggregation transmission, where an aggregation sequence number of the terminal device 2 is 0, and an aggregation sequence number of the terminal device 4 is 1.

In another optional manner, the network device sends sixth indication information to the first terminal device, where the sixth indication information indicates the first aggregation sequence. The sixth indication information includes an identifier of each of the N terminal devices and a corresponding aggregation sequence number.

S206. The first terminal device performs channel decoding on the second downlink bit sequence to obtain the first downlink bit sequence.

S207. The first terminal device obtains the first downlink data based on the first bit length, the first aggregation sequence, and the first downlink bit sequence. The first downlink data is downlink data of the first terminal device. The following provides descriptions in two cases.

The first terminal device determines location information of the first downlink data in the first downlink bit sequence based on the first bit length and the first aggregation sequence. Further, the terminal device obtains the first downlink data based on the location information of the first downlink data in the first downlink bit sequence and the first downlink bit sequence. For a specific implementation process, refer to related descriptions in S106.

In this embodiment, the network device performs, based on a specific aggregation sequence, bit aggregation on the downlink data of the N terminal devices, and performs channel encoding on an aggregated bit sequence, thereby increasing a sequence length before encoding, and improving a coding gain. Then, the network device calculates a CRC parity bit corresponding to the downlink data of each of the N terminal devices, and performs bit aggregation on the downlink data of each of the N terminal devices and the CRC parity bit corresponding to the downlink data of each of the N terminal devices based on the specific aggregation sequence. In this way, the terminal device determines, by using the CRC parity bit of the downlink data of the terminal device, whether the downlink data is correctly received, without being affected by whether downlink data of another terminal device is correctly received. In addition, when the bit length of the downlink data of each terminal device participating in aggregation is the same, the network device implicitly indicates location information of the downlink data of the terminal device participating in aggregation and check information of the downlink data in the data obtained through the bit aggregation, without additional signaling overheads.

Figure 6:
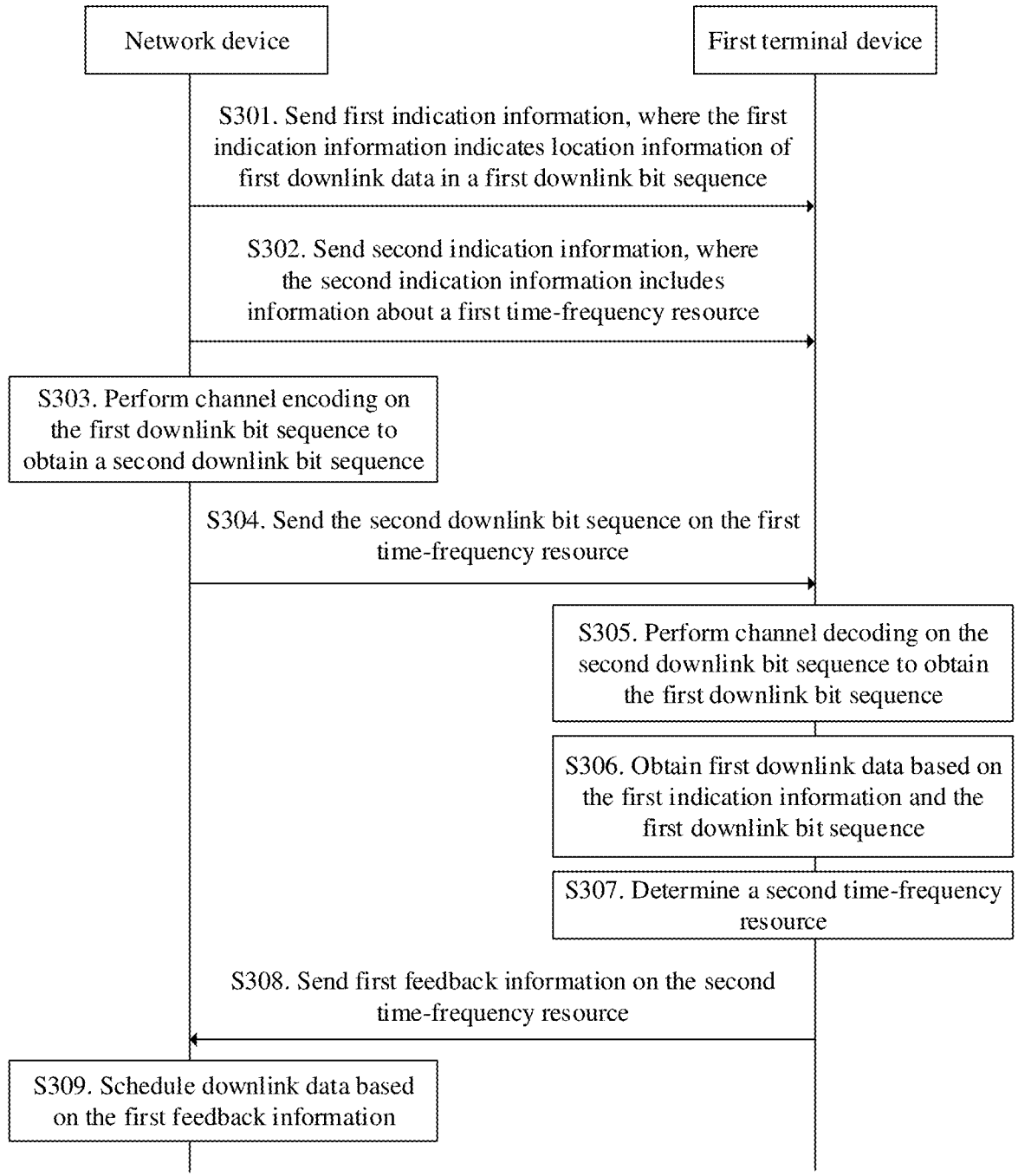
FIG. 6 is a schematic flowchart of a method for aggregation transmission of multi-user downlink data according to an embodiment of this application.

FIG. 6 is a schematic flowchart of a method for aggregation transmission of multi-user downlink data according to an embodiment of this application. This embodiment relates to a specific process of performing downlink data transmission and uplink data transmission between a network device and a terminal device. A core idea of this embodiment is that the network device performs, based on a specific aggregation rule, bit aggregation on downlink data of the terminal device that is in a terminal device group and that is to receive data, and each terminal device obtains, based on the aggregation rule, respective downlink data from the received data obtained through the bit aggregation, and sends feedback information of the downlink data to the network device. The following uses an example in which the network device and a first terminal device perform the method for description. The first terminal device is one terminal device in the terminal device group. The method is further performed by a module of the network device and a module of the first terminal device, for example, a chip. As shown in FIG. 6, the method includes the following steps.

For detailed descriptions of S301 to S305, refer to S101 to S105 in FIG. 2.

S306. The first terminal device determines a second time-frequency resource, where the second time-frequency resource is used to send first feedback information.

The first terminal device determines the second time-frequency resource in the following three manners.

Manner 1: The first terminal device receives a first index from the network device. The first index is an index of the first terminal device in the terminal device group. Optionally, the network device sends the first index to the first terminal device by using signaling. The first terminal device obtains information about a reference time-frequency resource, and determines the second time-frequency resource based on the first index and the reference time-frequency resource. The reference time-frequency resource is notified by the network device to the first terminal device by using signaling, or is preset by a system.

The first terminal device determines the second time-frequency resource based on the first index and the reference time-frequency resource in the following two implementations.

Manner 1.1: The reference time-frequency resource includes M uplink resources. For example, M is equal to 4. The information about the reference time-frequency resource is shown in Table 1. A time-frequency resource 1, a time-frequency resource 2, a time-frequency resource 3, and a time-frequency resource 4 are pairwise orthogonal. The first terminal device determines the second time-frequency resource based on a time-frequency resource corresponding to the first index in Table 1. For example, if the first index is 2, the first terminal device determines, based on Table 1, that the second time-frequency resource is the time-frequency resource 3.

Manner 1.2: The reference time-frequency resource is an uplink resource used by a third terminal device to send third feedback information, where the third feedback information is response information of the third terminal device for third downlink data, or the third feedback information is response information of the third terminal device for the first downlink bit sequence. The third downlink data is downlink data of the third terminal device. Optionally, the third terminal device is preset. For example, the third terminal device is a terminal device with the smallest index in M terminal devices. An index of the third terminal device in the terminal device group is a second index, and the first terminal device determines the second time-frequency resource based on a difference between the first index and the second index. For example, the difference between the first index and the second index is k, and a difference between a number of a start resource block (RB) of the second time-frequency resource and a number of a start RB of the reference time-frequency resource is S·k, where S is preset or is configured by the network device for the first terminal device by using RRC signaling or MAC signaling.

TABLE 1

Mapping relationship between an index of the terminal device and a time-frequency resource

| Index of the terminal device in the terminal device group | Time-frequency resource |
| --- | --- |
| 0 | Time-frequency resource 1 |
| 1 | Time-frequency resource 2 |
| 2 | Time-frequency resource 3 |
| 3 | Time-frequency resource 4 |

Manner 2: The network device configures a first uplink resource set for the first terminal device by using signaling, where the first uplink resource set includes Q uplink resources, and Q is a positive integer. The first terminal device determines the second time-frequency resource based on a received PUCCH resource indicator (PRI) and the first uplink resource set.

Manner 3: The network device sends information about the second time-frequency resource to the first terminal device by using signaling.

When the network device determines the first downlink bit sequence based on the second manner in step S103, the second time-frequency resource and a third time-frequency resource is the same. Optionally, the network device sends the information about the second time-frequency resource to the first terminal device by using signaling.

S307. The first terminal device sends the first feedback information to the network device on the second time-frequency resource. Correspondingly, the network device receives the first feedback information from the first terminal device on the second time-frequency resource. The first feedback information is response information of the first terminal device for the first downlink data, or the first feedback information is response information of the first terminal device for the first downlink bit sequence.

In an optional manner, the first feedback information is the response information of the first terminal device for the first downlink data. When the first terminal device correctly receives the first downlink data, the first feedback information is acknowledgement (ACK) information. When the first terminal device does not correctly receive the first downlink data, the first feedback information is negative acknowledgement (NACK) information.

In another optional manner, the first feedback information is the response information of the first terminal device for the first downlink bit sequence. When the first terminal device correctly receives the first downlink bit sequence, the first feedback information is ACK information. When the first terminal device does not correctly receive the first downlink bit sequence, the first feedback information is NACK information. The first feedback information is alternatively preset information, and the preset information is shared by the N terminal devices. Optionally, the preset information is a special sequence or a special modulation symbol. When the first terminal device does not correctly receive the first downlink bit sequence, the first terminal device sends the preset information. Alternatively, when the first terminal device correctly receives the first downlink bit sequence, a value of the preset information is a first value. When the first terminal device does not correctly receive the first downlink bit sequence, a value of the preset information is a second value, and the first value is different from the second value. Optionally, the first value and the second value are preset by a system, or are notified by the network device to the first terminal device by using signaling.

S308. The network device schedules downlink data based on the first feedback information.

When the first terminal device does not correctly receive the first downlink data or does not correctly receive the first downlink bit sequence, the network device performs retransmission scheduling. The network device determines third downlink bit sequence. Optionally, the third downlink bit sequence is the same as the first downlink bit sequence, and the network device indicates, by using a new data indicator (NDI), that current transmission is retransmission. Alternatively, the third downlink bit sequence is different from the first downlink bit sequence. The network device re-aggregates downlink data of a terminal device that feeds back NACK information, to obtain the third downlink bit sequence. The network device performs channel encoding on the third downlink bit sequence, and sends the third downlink bit sequence to a terminal device that requires retransmission. In addition, the network device indicates, by using an NDI, that current transmission is new transmission.

The network device determines, in the following several manners, that the first terminal device does not correctly receive the first downlink data/the first downlink bit sequence. In an optional manner, when the network device receives the NACK information of the first terminal device, the indication is that the first terminal device does not correctly receive the first downlink data/the first downlink bit sequence. In another optional manner, when the network device detects energy on the second time-frequency resource, detects a special sequence, or detects a special symbol, the indication is that the first terminal device does not correctly receive the first downlink data/the first downlink bit sequence. Alternatively, the network device determines, based on a value of information received on the second time-frequency resource, whether to perform retransmission scheduling. For example, when a value of the received information is the second value, the indication is that the first terminal device does not correctly receive the first downlink data/the first downlink bit sequence.

In this embodiment, the network device performs, based on a specific rule, bit aggregation on the downlink data of the N terminal devices, and performs channel encoding on an aggregated bit sequence, thereby increasing a sequence length before encoding, and improving a coding gain. Then, the network device calculates cyclic redundancy check information corresponding to the downlink data of each of the N terminal devices, and performs, based on the specific aggregation sequence, bit aggregation on the downlink data of each of the N terminal devices and the cyclic redundancy check information corresponding to the downlink data of each of the N terminal devices. In this way, the terminal device determines, by using the CRC information corresponding to the downlink data of the terminal device, whether the downlink data is correctly received, without being affected by whether downlink data of another terminal device is correctly received. In addition, the network device repackages, based on feedback information of the terminal device, incorrectly received downlink data, thereby reducing resource consumption caused by repeated data transmission.

Step S306 to S309 is further combined with the embodiment in FIG. 5, and details are not described herein again.

To implement functions in the foregoing embodiments, the network device and the terminal device include corresponding hardware structures and/or software modules for performing the functions. A person of ordinary skill in the art is aware that, in combination with the units and the method steps in the examples described in the embodiments disclosed in this application, this application is configured to be implemented by hardware or a combination of hardware and computer software. Whether a function is performed by hardware or hardware driven by computer software depends on particular application scenarios and design constraints of the technical solutions.

Figure 7:
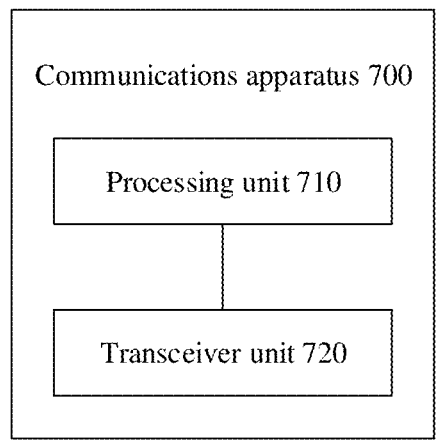
FIG. 7 is a schematic diagram of a structure of a possible communications apparatus according to an embodiment of this application.
Figure 8:
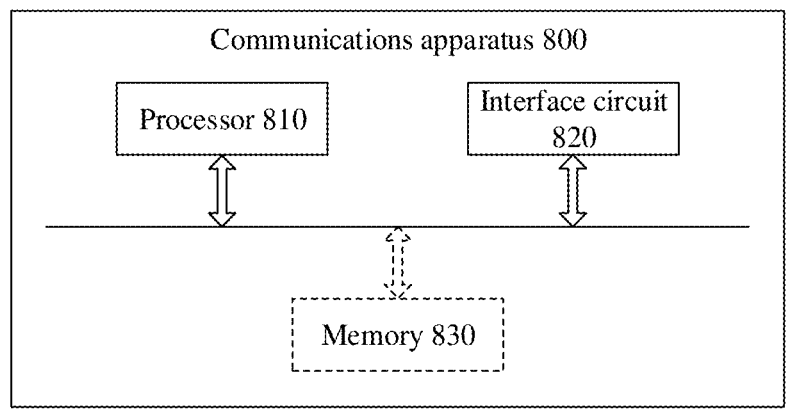
FIG. 8 is a schematic diagram of a structure of a possible communications apparatus according to an embodiment of this application.

FIG. 7 and FIG. 8 are schematic diagrams of structures of possible communications apparatuses according to embodiments of this application. These communications apparatuses are configured to implement functions of the terminal device or the network device in the foregoing method embodiments, and therefore is configured to further achieve beneficial effects of the foregoing method embodiments. In the embodiments of this application, the communications apparatus is the terminal device 130 or the terminal device 140 shown in FIG. 1, is the radio access network device 120 shown in FIG. 1, or is a module (for example, a chip) used in the terminal device or the network device.

As shown in FIG. 7, a communications apparatus 700 includes a processing unit 710 and a transceiver unit 720. The communications apparatus 700 is configured to implement functions of the first terminal device or the network device in the method embodiment shown in FIG. 4, FIG. 5, or FIG. 6.

When the communications apparatus 700 is configured to implement the functions of the first terminal device in the method embodiment shown in FIG. 4, the transceiver unit 720 is configured to receive first indication information from the network device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The transceiver unit 720 is further configured to receive second indication information from the network device, where the second indication information includes information about a first time-frequency resource. The transceiver unit 720 is further configured to receive a second downlink bit sequence from the network device on the first time-frequency resource. The processing unit 710 is configured to perform channel decoding on the second downlink bit sequence to obtain the first downlink bit sequence. The processing unit 710 is further configured to obtain the first downlink data based on the first indication information and the first downlink bit sequence.

When the communications apparatus 700 is configured to implement the functions of the network device in the method embodiment shown in FIG. 4, the transceiver unit 720 is configured to send first indication information to the first terminal device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The transceiver unit 720 is further configured to send second indication information to the first terminal device, where the second indication information includes information about the first time-frequency resource. The processing unit 710 is configured to determine the first downlink bit sequence based on the first downlink data and second downlink data, where the second downlink data is downlink data of a second terminal device, and the second terminal device is a terminal device other than the first terminal device in the N terminal devices. The processing unit 710 is further configured to perform channel encoding on the first downlink bit sequence to obtain a second downlink bit sequence. The transceiver unit 720 is further configured to send the second downlink bit sequence to the first terminal device on the first time-frequency resource.

When the communications apparatus 700 is configured to implement the functions of the first terminal device in the method embodiment shown in FIG. 5, the transceiver unit 720 is configured to obtain a first bit length. The first bit length is a bit length of downlink data of each of N terminal devices in a first downlink bit sequence. The first downlink bit sequence herein includes the downlink data of each of the N terminal devices, and the first downlink bit sequence is a bit sequence on which channel encoding is not performed. The first terminal device is one of the N terminal devices, and N is an integer greater than 1. The transceiver unit 720 is further configured to receive fifth indication information from the network device, where the fifth indication information includes information about a first time-frequency resource. A terminal device group to which the first terminal device belongs includes M terminal devices in total, M is an integer greater than or equal to N, and the fifth indication information further includes information used to indicate whether the M terminal devices participate in aggregation transmission. The transceiver unit 720 is further configured to receive a second downlink bit sequence from the network device on the first time-frequency resource. The processing unit 710 is configured to obtain a first aggregation sequence, where the first aggregation sequence is a sequence in which downlink data of the M terminal devices is aggregated. The processing unit 710 is further configured to perform channel decoding on the second downlink bit sequence to obtain the first downlink bit sequence. The processing unit 710 is further configured to obtain first downlink data based on the first bit length, the first aggregation sequence, and the first downlink bit sequence.

When the communications apparatus 700 is configured to implement the functions of the network device in the method embodiment shown in FIG. 5, the transceiver unit 720 is configured to send fifth indication information to the first terminal device. The fifth indication information includes information about a first time-frequency resource. A terminal device group to which the first terminal device belongs includes M terminal devices in total, M is an integer greater than or equal to N, and the fifth indication information further includes information used to indicate whether the M terminal devices participate in aggregation transmission. The processing unit 710 is configured to determine a first downlink bit sequence based on first downlink data and second downlink data, where the second downlink data is downlink data of a second terminal device, and the second terminal device is a terminal device other than the first terminal device in the N terminal devices. The processing unit 710 is further configured to perform channel encoding on the first downlink bit sequence to obtain a second downlink bit sequence. The transceiver unit 720 is further configured to send the second downlink bit sequence to the first terminal device on the first time-frequency resource.

When the communications apparatus 700 is configured to implement the functions of the first terminal device in the method embodiment shown in FIG. 6, the transceiver unit 720 is configured to receive first indication information from the network device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The transceiver unit 720 is further configured to receive second indication information from the network device, where the second indication information includes information about a first time-frequency resource. The transceiver unit 720 is further configured to receive a second downlink bit sequence from the network device on the first time-frequency resource. The processing unit 710 is configured to perform channel decoding on the second downlink bit sequence to obtain the first downlink bit sequence. The processing unit 710 is further configured to obtain the first downlink data based on the first indication information and the first downlink bit sequence. The processing unit 710 is further configured to determine a second time-frequency resource, where the second time-frequency resource is used to send first feedback information. The first feedback information is acknowledgement information of the first downlink data, or the first feedback information is acknowledgement information of the first downlink bit sequence. The transceiver unit 720 is further configured to send the first feedback information to the network device on the second time-frequency resource.

When the communications apparatus 700 is configured to implement the functions of the network device in the method embodiment shown in FIG. 6, the transceiver unit 720 is configured to send first indication information to the first terminal device. The first indication information indicates location information of first downlink data of the first terminal device in a first downlink bit sequence, and the first downlink bit sequence herein includes downlink data of each of N terminal devices. The first terminal device is one of the N terminal devices, and N is an integer greater than 1. The N terminal devices are N terminal devices in a terminal device group. The transceiver unit 720 is further configured to send second indication information to the first terminal device, where the second indication information includes information about the first time-frequency resource. The processing unit 710 is configured to determine the first downlink bit sequence based on the first downlink data and second downlink data, where the second downlink data is downlink data of a second terminal device, and the second terminal device is a terminal device other than the first terminal device in the N terminal devices. The processing unit 710 is further configured to perform channel encoding on the first downlink bit sequence to obtain a second downlink bit sequence. The transceiver unit 720 is further configured to send the second downlink bit sequence to the first terminal device on the first time-frequency resource. The processing unit 710 is further configured to determine a second time-frequency resource, where the second time-frequency resource is used to receive first feedback information. The first feedback information is response information of the first terminal device for the first downlink data, or the first feedback information is response information of the first terminal device for the first downlink bit sequence. The transceiver unit 720 is further configured to receive the first feedback information from the first terminal device on the second time-frequency resource. The processing unit 710 is further configured to schedule downlink data based on the first feedback information.

For more detailed descriptions of the processing unit 710 and the transceiver unit 720, directly refer to related descriptions in the method embodiments shown in FIG. 4, FIG. 5, and FIG. 6, and details are not described herein again.

As shown in FIG. 8, a communications apparatus 800 includes a processor 810 and an interface circuit 820. The processor 810 and the interface circuit 820 are coupled to each other. The interface circuit 820 is a transceiver or an input/output interface. Optionally, the communications apparatus 800 further includes a memory 830, configured to: store instructions to be executed by the processor 810, store input data required for running the instructions by the processor 810, or store data generated after the processor 810 runs the instructions.

When the communications apparatus 800 is configured to implement the methods shown in FIG. 4, FIG. 5, and FIG. 6, the processor 810 is configured to perform functions of the processing unit 710, and the interface circuit 820 is configured to perform functions of the transceiver unit 720.

When the communications apparatus is the chip used in the terminal device, the chip of the terminal device implements the functions of the terminal device in the foregoing method embodiments. The chip of the terminal device receives information from another module (for example, a radio frequency module or an antenna) of the terminal device, where the information is sent by the network device to the terminal device. Alternatively, the chip of the terminal device sends information to another module (for example, a radio frequency module or an antenna) of the terminal device, where the information is sent by the terminal device to the network device.

When the communications apparatus is the chip used in the network device, the chip of the network device implements the functions of the network device in the foregoing method embodiments. The chip of the network device receives information from another module (for example, a radio frequency module or an antenna) of the network device, where the information is sent by the terminal device to the network device. Alternatively, the chip of the network device sends information to another module (for example, a radio frequency module or an antenna) of the network device, where the information is sent by the network device to the terminal device.

The processor in the embodiments of this application is a central processing unit (CPU), is another general-purpose processor, a digital signal processor (DSP), an application-specific integrated circuit (ASIC), a field programmable gate array (FPGA), or another programmable logical device, a transistor logical device, a hardware component, or any combination thereof. The general-purpose processor is a microprocessor or any conventional processor.

The method steps in the embodiments of this application are implemented by hardware, or is implemented by executing software instructions by the processor. The software instruction includes a corresponding software module. The software module is stored in a random-access memory (RAM), a flash memory, a read-only memory (ROM), a programmable read-only memory (PROM), an erasable programmable read-only memory (EPROM), an electrically erasable programmable read-only memory (EEPROM), a register, a hard disk drive, a removable hard disk, a CD-ROM, or any other form of storage medium well-known in the art. For example, a storage medium is coupled to the processor, so that the processor is configured to read information from the storage medium or write information into the storage medium. Certainly, the storage medium is alternatively a component of the processor. The processor and the storage medium are in an ASIC. In addition, the ASIC is in a network device or a terminal device. Certainly, the processor and the storage medium exists in a network device or a terminal device as discrete components.

All or some of the foregoing embodiments are implemented by software, hardware, firmware, or any combination thereof. When software is used to implement the embodiments, all or some of the embodiments are implemented in a form of a computer program product. The computer program product includes one or more computer programs or instructions. When the computer programs or the instructions are loaded and executed on a computer, all or some of procedures or functions in the embodiments of this application are performed. The computer is a general-purpose computer, a special-purpose computer, a computer network, or other programmable apparatuses. The computer programs or the instructions are stored in a computer-readable storage medium, or is transmitted through the computer-readable storage medium. The computer-readable storage medium is any usable medium accessible by a computer, or a data storage device such as a server integrating one or more usable media. The usable medium is a magnetic medium, for example, a floppy disk, a hard disk drive, or a magnetic tape; or is an optical medium, for example, a DVD; or is a semiconductor medium, for example, a solid-state disk (SSD).

In the embodiments of this application, unless otherwise stated or there is a logic conflict, terms and/or descriptions between different embodiments are consistent and is mutually referenced, and technical features in different embodiments are combined based on an internal logical relationship thereof, to form a new embodiment.

In this application, "at least one" means one or more, and "a plurality of" means two or more. The term "and/or" describes an association relationship between associated objects and indicates that three relationships exists. For example, A and/or B indicates the following cases: A exists, both A and B exist, and B exists, where A and B is singular or plural. The symbol "/" in the text description of this application generally represents an "or" relationship between associated objects. In a formula of this application, the symbol "/" indicates a "division" relationship between associated objects.

It is understood that various numbers in the embodiments of this application are merely used for ease of distinguishing, and are not intended to limit the scope of the embodiments of this application. The sequence numbers of the foregoing processes do not mean an execution sequence, and the execution sequence of the processes are determined based on functions and internal logic of the processes.

What is claimed is:

1. A method for aggregation transmission of multi-user downlink data, wherein the method is performed by a first communications apparatus, the first communications apparatus is a first terminal device or a module of the first terminal device, and the method comprises:
   receiving first indication information from a network device, wherein:
      the first indication information indicates location information of first downlink data of the first terminal device in a first downlink bit sequence;
      the first downlink bit sequence comprises downlink data of each of N terminal devices, the first terminal device is one of the N terminal devices; and
      N is an integer greater than 1;
   receiving second indication information from the network device, wherein the second indication information comprises information about a first time-frequency resource;
   receiving a second downlink bit sequence on the first time-frequency resource;
   performing channel decoding on the second downlink bit sequence to obtain the first downlink bit sequence; and
   obtaining the first downlink data based on the first indication information and the first downlink bit sequence.

2. The method according to claim 1, wherein the method further comprises:
   receiving a first index from the network device, wherein the first index is an index of the first terminal device in a terminal device group, and the terminal device group comprises the N terminal devices.

3. The method according to claim 2, wherein the method further comprises:
   determining a second time-frequency resource based on the first index and a reference time-frequency resource, wherein:
      the second time-frequency resource is used to send first feedback information; and
      the first feedback information is acknowledgement information of the first downlink data.

4. The method according to claim 3, wherein the method further comprises:
   sending the first feedback information on the second time-frequency resource.

5. The method according to claim 4, wherein the method further comprises:
   obtaining first location information, wherein:
      the first location information is location information of first check information in the first downlink bit sequence;
      the first location information is different from second location information:
      the second location information is location information of second check information in the first downlink bit sequence;
      the first check information is a parity bit of the first downlink data;
      the second check information is a parity bit of second downlink data;
      the second downlink data is downlink data of a second terminal device; and
      the second terminal device is a terminal device other than the first terminal device in the N terminal devices; and
   determining the first check information based on the first location information and the first downlink bit sequence.

6. The method according to claim 5, wherein the method further comprises:
   determining the first feedback information based on the first check information.

7. The method according to claim 5, wherein:
   the first location information comprises:
      a start location;
      an end location; or
      a bit length of the first check information in the first downlink bit sequence; and
   the second location information comprises:
      a start location;
      an end location; or
      a bit length of the second check information in the first downlink bit sequence.

8. The method according to claim 1, wherein:
   the first indication information indicates a start location or an end location of the first downlink data in the first downlink bit sequence; or
   the first indication information indicates a sequence number of the first downlink data in the first downlink bit sequence and a bit length of downlink data of each of the N terminal devices.

9. An apparatus, applied in a first terminal device, comprising:
   a memory; and
   one or more processors coupled to the memory, wherein the one or more processors are configured to:
      receive first indication information from a network device, wherein:
         the first indication information indicates location information of first downlink data of the first terminal device in a first downlink bit sequence;
         the first downlink bit sequence comprises downlink data of each of N terminal devices;
         the first terminal device is one of the N terminal devices; and
         N is an integer greater than 1;
      receive second indication information from the network device, wherein the second indication information comprises information about a first time-frequency resource;
      receive a second downlink bit sequence on the first time-frequency resource;
      perform channel decoding on the second downlink bit sequence to obtain the first downlink bit sequence; and
      obtain the first downlink data based on the first indication information and the first downlink bit sequence.

10. The apparatus according to claim 9, wherein the one or more processors are further configured to:
    receive a first index from the network device, wherein:
       the first index is an index of the first terminal device in a terminal device group; and
       the terminal device group comprises the N terminal devices.

11. The apparatus according to claim 10, wherein one or more processors are further configured to:
  determine a second time-frequency resource based on the first index and a reference time-frequency resource, wherein:
    the second time-frequency resource is used to send first feedback information; and
    the first feedback information is acknowledgement information of the first downlink data.

12. The apparatus according to claim 11, wherein the one or more processors are further configured to:
  send the first feedback information on the second time-frequency resource.

13. The apparatus according to claim 12, wherein the one or more processors are further configured to:
  obtain first location information, wherein:
    the first location information is location information of first check information in the first downlink bit sequence;
    the first location information is different from second location information;
    the second location information is location information of second check information in the first downlink bit sequence;
    the first check information is a parity bit of the first downlink data;
    the second check information is a parity bit of second downlink data;
    the second downlink data is downlink data of a second terminal device; and
    the second terminal device is a terminal device other than the first terminal device in the N terminal devices; and
  determine the first check information based on the first location information and the first downlink bit sequence.

14. The apparatus according to claim 13, wherein the one or more processors are further configured to:
  determine the first feedback information based on the first check information.

15. The apparatus according to claim 13, wherein
  the first location information comprises:
    a start location;
    an end location; or
    a bit length of the first check information in the first downlink bit sequence; and
  the second location information comprises:
    a start location;
    an end location; or
    a bit length of the second check information in the first downlink bit sequence.

16. The apparatus according to claim 9, wherein
  the first indication information indicates a start location or an end location of the first downlink data in the first downlink bit sequence; or
  the first indication information indicates a sequence number of the first downlink data in the first downlink bit sequence and a bit length of downlink data of each of the N terminal devices.

* * * * *